United States Patent [19]
Heule

[11] Patent Number: 5,803,679
[45] Date of Patent: Sep. 8, 1998

[54] DEBURRING TOOL FOR DEBURRING THE EDGES OF BOREHOLES

[76] Inventor: Ulf H. Heule, Jacob-Schmid-Heinrich-Str. 12, CH-9436 Balgach, Switzerland

[21] Appl. No.: 680,517

[22] Filed: Jul. 9, 1996

[51] Int. Cl.⁶ .............................. B23B 51/08; B23B 51/10
[52] U.S. Cl. ......................... 408/211; 408/199; 408/194; 408/714
[58] Field of Search .................... 408/199, 211, 408/714, 147, 154, 158, 161, 168, 80–82, 189, 186, 194, 196, 225; 407/8–10

[56] References Cited

U.S. PATENT DOCUMENTS

| | | | |
|---|---|---|---|
| 2,895,354 | 7/1959 | Cogsdill | 408/714 |
| 3,087,359 | 4/1963 | Cogsdill | 408/714 |
| 3,973,861 | 8/1976 | Sussmuth | 408/227 |
| 5,181,810 | 1/1993 | Heule | 408/714 |
| 5,297,905 | 3/1994 | Schmidt et al. | 407/8 |

*Primary Examiner*—Steven C. Bishop
*Attorney, Agent, or Firm*—Baker & Maxham

[57] ABSTRACT

A deburring tool for deburring the edges of boreholes. The tool has a base body in which at least one recess aligned across the longitudinal axis of the base body is provided, where at least one blade is arranged in said recess so it can be displaced under spring load in the longitudinal direction of the recess. A compression spring is provided in the longitudinal bore of the base body and comes in contact with one end of a control pin whose other end engages in a control recess in the blade to provide at least a holding power to the blade in the direction of displacement.

11 Claims, 3 Drawing Sheets

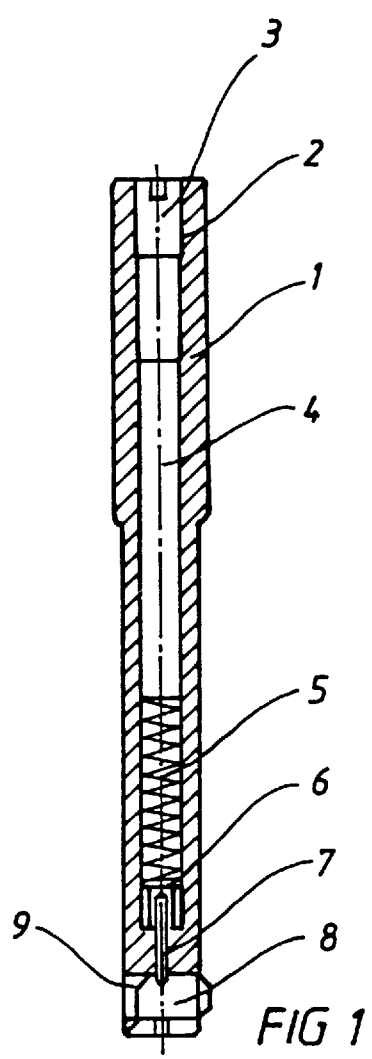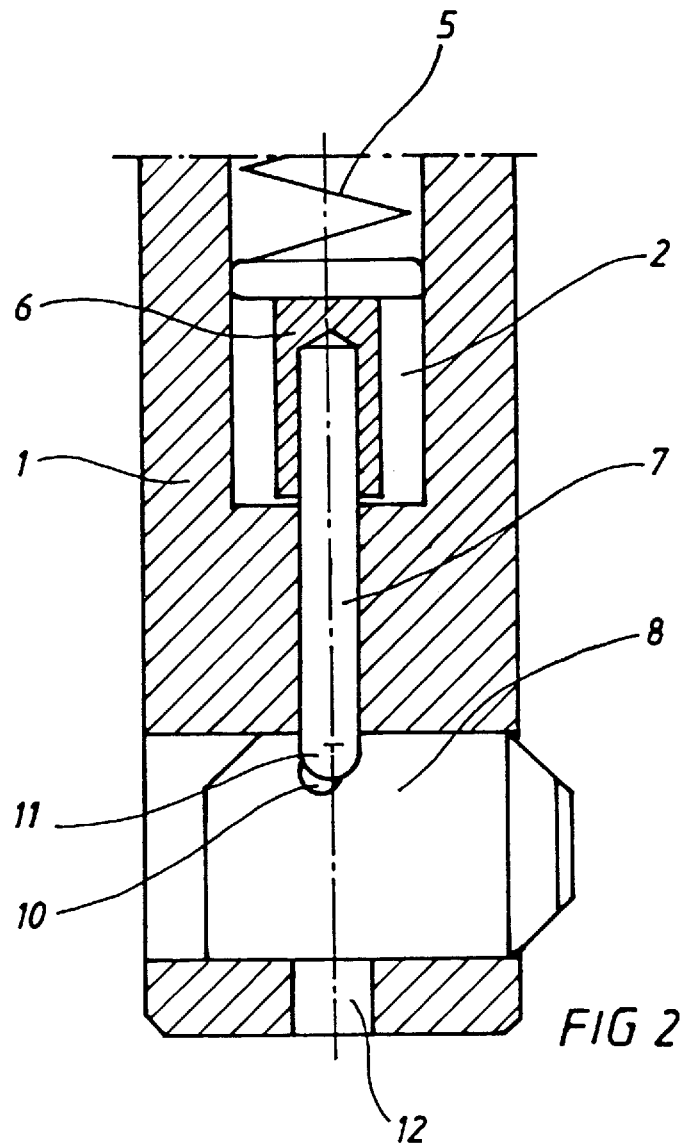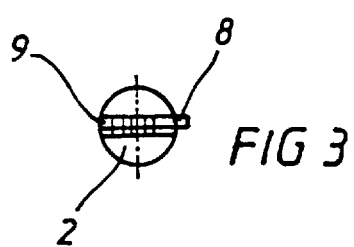
FIG 1
FIG 2
FIG 3

DEBURRING TOOL FOR DEBURRING THE EDGES OF BOREHOLES

BACKGROUND OF THE INVENTION

1. Field of the Invention

The invention generally concerns a deburring tool for deburring the edges of boreholes, and more particularly concerns an economically constructed deburring tool which can be made sufficiently small to debur the edges of even small boreholes.

2. Description of the Related Art

Several different types of deburring tools are known. State-of-the-art designs have in common the fact that the blade arranged in the transverse recess in the base body is displaced laterally by a rocker controller that is mounted in the base body so it can rotate. Consequently, one or more blades that are mounted so they can be displaced in the recess are also displaced with the spring-loaded rotation of this rocker controller.

However, disadvantages of the arrangement of a rocker controller that can rotate about its longitudinal axis include the fact that the spring required for the rotational drive of the rocker controller is a relatively complicated design and the rocker controller experiences relatively great friction that counteracts its rotation in the recess. Such a deburring tool is not suitable for miniaturization in particular and it is also relatively expensive to manufacture.

SUMMARY OF THE INVENTION

A major purpose of this invention is to improve on a deburring tool of the type mentioned above such that it is much less expensive to manufacture and it can be miniaturized to a significant extent so that even small borehole edges can be deburred.

An important feature of the invention is that at least one compression spring is provided in a longitudinal bore in the base body and is in contact with one end of a control pin that can be displaced axially and whose other end engages in a control recess provided in the blade to impart to the blade at least a holding force in the direction of displacement. Thus, an important aspect of this invention is that the control pin is no longer designed to rotate about its longitudinal axis but instead it is designed to be displaced in the axial direction in the longitudinal recess in the base body. This yields the advantage that the drive for the spring-loaded displacement of this control pin can be much simpler and takes up less space accordingly. A simple spring, such as a helical compression spring, a torsion spring or a spiral spring, may be used and is responsible for the direct axial displacement driving force for the control pin. It is important that the free lower end of this control pin engages with a spring force in a suitable control recess on the top of the blade. The control recess is designed so that different holding forces can act on the blade.

In deburring borehole edges, it is important for the blade to be held relatively rigidly and immovably in its deburring or cutting position in the base body in order to be able to absorb the respective cutting and machining forces. For this purpose, the spring-loaded control pin is anchored in the control recess in such a way that the holding force of the blade in the transverse recess in the base body is as great as possible so the blade is not forced back into the recess during the cutting and machining operation in an unwanted manner.

With an increase in the pressure on the blade in machining, a corresponding displacement force acting in the longitudinal direction of the transverse recess is applied to the blade and tends to press the blade back into this recess. While this force is acting, this invention provides for the spring-loaded head of the pressure pin to slide along a straight line with a relatively steep slope in the area of the control recess up to an edge where this line develops into a line with a lower slope.

Thus, as long as the spring-loaded head of the pressure pin is in contact with this steeper line and is sliding along it, the machining pressure on the blade remains relatively constant, so it is capable of creating a margin 3 mm wide, for example, on the edge of a borehole. Only when the deburring tool is placed on the edge of a borehole with an increasing pressure does the spring-loaded head of the pressure pin "snap" over the edge of the steep line and enter the range of a second line that is not as steep as the first line. Consequently, the blade does not then present any great resistance to displacement into the recess of the deburring tool, so it is displaced into the recess in accordance with the increasing pressure on the deburring tool.

In other words, the cutting edges arranged conically on the blade develop into a forward non-cutting area according to this invention, and this non-cutting area of the cutting blade is in contact with the inside wall of the borehole to be deburred. Thus, in this displaced position, the blade is displaced into the transverse recess to the extent that the cutting edges no longer engage with the edge of the borehole. The cutting blade is thus guided through the borehole in the axial direction and comes out of the borehole on the other side (if it is a through-bore), and as this deburring tool emerges from the through-hole, the blade snaps again out of the transverse recess in the base body and the cutting edges are again available for deburring the edges of the borehole on the rear of the through-hole.

The deburring tool is then operated in the reverse direction, in other words, the other cutting edge of the blade can be used for deburring the rear edge of the through-hole in a manner similar to that described above in conjunction with the forward action.

Otherwise, the same conditions also prevail here, that is, the blade retreats back into the recess against the force of the spring-loaded pressure pin, the machining pressure on the blade increases until the spring-loaded pressure pin runs again along the line with a lower slope and the previously strong holding force of the blade changes into a weaker holding force, with the result that the blade is pushed into the transverse recess and the cutting edge disengages with the borehole edge to be deburred.

The present invention is not limited to the use of a single pressure pin. Two pressure pins arranged in parallel may also be used, where each pressure pin is then matched with a blade in the manner described below.

Likewise, in another embodiment of this invention, more than one blade is provided in one recess, whereby one blade then points toward one side of the recess while the other blade points to the opposite side of the recess.

In a third embodiment of this invention, several such blades are arranged one above the other in a deburring tool and the driving force described above is provided for each blade.

BRIEF DESCRIPTION OF THE DRAWING

The objects, advantages and features of this invention will be more readily perceived from the following detailed description, when read in conjunction with the accompanying drawing, in which:

FIG. 1 is a schematic diagram of a section through a deburring tool according to the invention;

FIG. 2 is an enlarged section through the lower part of the deburring tool of FIG. 1;

FIG. 3 is a front view of the deburring tool of FIG. 1;

DETAILED DESCRIPTION OF THE PREFERRED EMBODIMENTS

Figure 4:
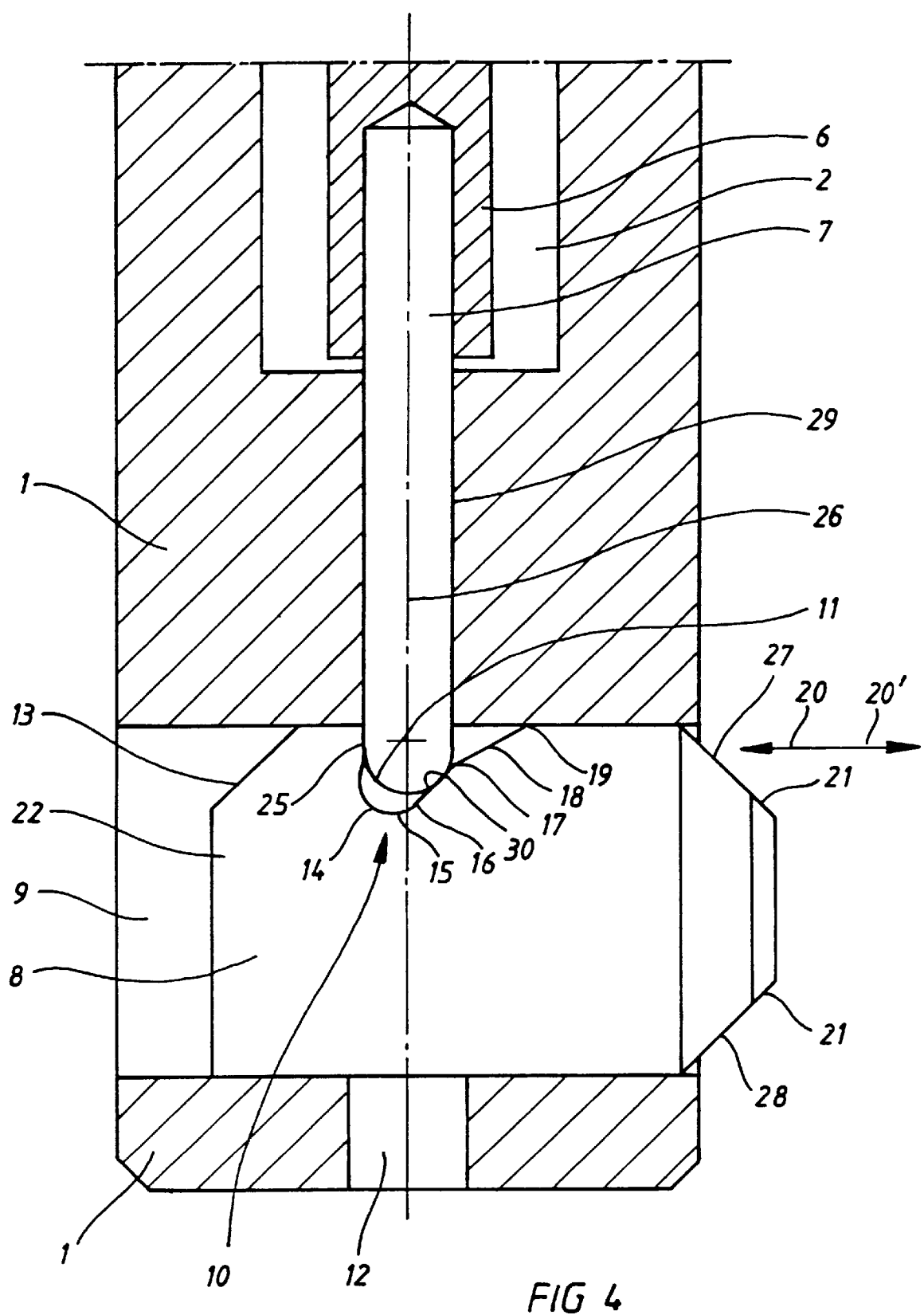
FIG. 4 is a further enlarged sectional view of the deburring tool of FIG. 2.

With reference now to the drawing, and more particularly to FIGS. 1–4, an approximately cylindrical base body 1, preferably made of a metal or plastic material, accommodates threaded screw 3, which is lengthened at the lower end by shank 4, in longitudinal borehole 2. Threaded screw 3 and shank 4 may be designed as separate parts, but they can also be made of one piece of material.

One end of cylindrical compression spring 5 is in contact with the lower end of shank 4, and the other end is in contact with the top side of spring plate 6. Spring plate 6 consists of an approximately disc-shaped plate having a lower central shoulder with a blind hole into which one end of control pin 7 engages. Control pin 7 is held by spring force in borehole 29 (FIG. 4) of base body 1 so it is axially displaceable in the direction of the longitudinal axis of the base body (and thus in the direction of its center line 26).

The lower end of control pin 7 is designed as a head 11 having a spring-loaded engagement in matching control camming recess 10 in the upper edge of blade 8. Blade 8 is mounted so it can be rectilinearly displaced in recess 9 running across the center line 26 in base body 1.

The deburring tool is formed with a lower face as part of base body 1, the lower face having central borehole 12 therethrough.

Blade 8 is arranged so it can be displaced in the direction of arrows 20, 20' in recess 9 under the spring load of control pin 7.

FIG. 4 shows the deburring position of blade 8, where it can be seen that the blade has moved as far as possible out of recess 9. If the deburring tool is operated in forward mode, lower cutting edge 28 of the blade is in contact with the edge of a borehole (not shown) into which base body 1 is inserted at its lower end.

The design of control recess 10 in combination with the shape of head 11 of control pin 7 is important. On the left side of FIG. 4, an approximately vertical stop edge 25 extends upward from lower radius 14 that is arranged with a lateral offset with respect to center line 26 and it develops into the upper horizontal edge of blade 8. With this stop edge 25, a stop is created on the side of control pin 7 so that blade 8 cannot fall out of recess 9 in the direction of arrow 20'. At the same time, the other side of head 11 of control pin 7 is in contact with straight line 16 that connects with radius 14 at position 15 and extends approximately to position 17. This straight line 16 has a relatively steep slope with respect to center line 26. Consequently, blade 8 loses a great holding force during the cutting operation of the blade (while cutting edge 28 is engaged with the edge of the borehole to be deburred) as security against displacement into the recess in the direction of the arrow.

With an increase in pressure on the deburring tool in the direction of center line 26, however, the displacement tendency acting on blade 8 in the direction of arrow 20 also increases, while at the same time part 30 of head 11 is displaced upward along line 16 to approximately position 17.

As soon as part 30 has reached this position 17, the steep straight line 16 transitions into straight line 18 with a lower slope extending from position 17 to position 19. As soon as part 30 enters the area of this line 18, the previously great holding force which provides assurance against displacement in the direction of arrow 20 is replaced by a weaker holding force and then the blade slides into recess 9 in the direction of arrow 20.

Then cutting edge 28 disengages with the edge of the borehole because only the non-cutting control edge 21 comes out of recess 9 and assures a further displacement of blade 8 into recess 9 without the borehole itself being cut or machined. Control edges 21 are thus designed so they are non-cutting edges.

The blade is then shifted into recess 9 with relatively little opposing force, while at the same time the deburring tool is guided through the borehole until the blade snaps out of recess 9 again on the rear of the hole in the direction of arrow 20'. This permits the rear of the borehole can be deburred.

The same procedure as described above begins in a similar way, in other words, part 30 of head 11 is again on line 16 and this time the cutting edge 27 is engaged with the rear edge of the through-hole.

It is, of course, not necessary for cutting edges 27, 28 to have the same design. They may differ from each other in angle or by having different shapes. Likewise, it is not essential for the slope of cutting edges 27, 28 to meet the slope of the non-cutting control edges 21, 22 at the same angle. Other slopes at angles to each other may also be used.

For an advantageous method of mounting of blade 8 in recess 9, rear edge 22 is inserted into recess 9 in the direction of arrow 20, so the spring-loaded control pin 7 engages with insertion slope 13. Control pin 7 is raised upwardly by this insertion slope and then snaps into control recess 10 as blade 8 is inserted further into the recess in the direction of arrows 20 and comes in contact with stop edge 25.

Figure 5:
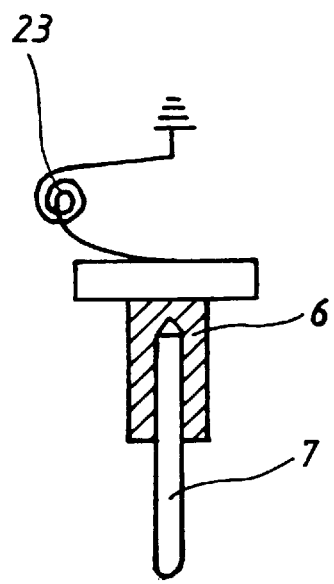
FIG. 5 is a partial sectional diagram of a second embodiment of the spring drive for the pressure pin of the invention.
Figure 6:
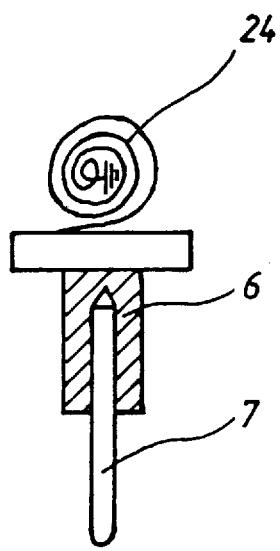
FIG. 6 is a diagram similar to FIG. 5 of a third embodiment of the spring drive for the pressure pin.

FIGS. 5 and 6 show that instead of a helical cylindrical compression spring 5, as shown in FIGS. 1 and 2, other types of springs may also be used. FIG. 5 illustrates the use of a torsion spring 23, while FIG. 6 shows the use of a spiral spring 24.

In view of the above description it is likely that modifications and improvements will occur to those skilled in the applicable technical field which are within the scope of the present invention. Accordingly, the invention is limited only by the spirit and scope of the following claims.

What is claimed is:

1. Deburring tool for deburring the edges of boreholes, comprising a base body (1) in which there is at least one recess (9) running across the longitudinal axis of the base body, at least one blade (8) mounted in said recess to be displaced rectilinearly under spring load in the longitudinal direction of the recess (9), a spring (5) mounted in a longitudinal borehole in the base body (1) and in contact with one end of a control pin, (7) the control pin having an other end engaging in a control recess (10) in the blade, (8) the control recess having a sloping camming surface whereby the said other end exerts on the blade (8) at least a holding force in the direction of displacement (20, 20').

2. The deburring tool recited in claim 1, and further comprising a spring plate in said longitudinal bore, said spring plate having a borehole therein, one end of said control pin being accommodated in said borehole in said spring plate, said spring means being in contact with said spring plate.

3. Deburring tool according to claim 1 or 2, characterized in that the compression spring (5) is a helical compression spring.

4. Deburring tool according to claim 1 or 2, characterized in that the compression spring (5) is a torsion spring.

5. Deburring tool according to claim 1 or 2, characterized in that the compression spring (5) is a spiral spring.

6. A blade for a deburring tool for deburring the edges of boreholes, the tool having a base body in which there is at least one recess running across the longitudinal axis thereof, said base body having a longitudinal bore therein with a spring loaded control pin therein, said control pin having an axis, said blade comprising:

a radius from which extends a first straight line at an inclination of said axis of said control pin, followed by a second straight line having a lower slope than said first straight line;

said blade being shaped and configured to be slidably received in said recess in said base body, its position being controlled by the position of said control pin with respect to said radius and said first and second straight lines in said blade.

7. The blade recited in claim 6, wherein said radius is arranged in said control recess such that it is offset laterally relative to said axis of said control pin.

8. The blade recited in claim 6 or 7, said blade further comprising an insertion slope on the rear of said blade.

9. The blade recited in claim 8, wherein said insertion slope is inclined in the same direction as said first and second straight lines of said control recess.

10. The blade recited in claim 6 or 7, said blade further comprising an approximately vertical stop edge adjacent to said radius and in contact with the side of said control pin as a displacement stop.

11. The blade recited in claim 8, said blade further comprising an approximately vertical stop edge adjacent to said radius and in contact with the side of said control pin as a displacement stop.

* * * * *